(12) United States Patent
Geuens et al.

(10) Patent No.: US 8,973,830 B2
(45) Date of Patent: Mar. 10, 2015

(54) PET-C BASED SECURITY LAMINATES AND DOCUMENTS

(75) Inventors: Ingrid Geuens, Emblem (BE); Bart Waumans, Puurs (BE); Vera Drieghe, Kontich (BE)

(73) Assignee: Agfa-Gevaert N.V., Mortsel (BE)

(*) Notice: Subject to any disclaimer, the term of this patent is extended or adjusted under 35 U.S.C. 154(b) by 194 days.

(21) Appl. No.: 13/637,837

(22) PCT Filed: Mar. 28, 2011

(86) PCT No.: PCT/EP2011/054677
§ 371 (c)(1),
(2), (4) Date: Sep. 27, 2012

(87) PCT Pub. No.: WO2011/124485
PCT Pub. Date: Oct. 13, 2011

(65) Prior Publication Data
US 2013/0008965 A1    Jan. 10, 2013

Related U.S. Application Data

(60) Provisional application No. 61/328,651, filed on Apr. 28, 2010.

(30) Foreign Application Priority Data

Apr. 8, 2010   (EP) ..................................... 10159283

(51) Int. Cl.
*G06K 19/02* (2006.01)
*B29C 55/02* (2006.01)
(Continued)

(52) U.S. Cl.
CPC ............ *B29C 55/026* (2013.01); *B32B 37/144* (2013.01); *B42D 25/00* (2014.10);
(Continued)

(58) Field of Classification Search
USPC ............ 235/488, 379; 283/72, 74; 428/847.4, 428/511
See application file for complete search history.

(56) References Cited

U.S. PATENT DOCUMENTS 4,391,767 A    7/1983   Pears
5,171,625 A   12/1992   Newton
(Continued)

FOREIGN PATENT DOCUMENTS

| EP | 0 000 421 A1 | 1/1979 |
| GB | 811066 | 3/1959 |
| WO | WO 2009/063058 A1 | 5/2009 |

OTHER PUBLICATIONS

International Search Report prepared by the International Searching Authority in International application No. PCT/EP2011/054677, mailed Jun. 28, 2011.

*Primary Examiner* — Ahshik Kim
(74) *Attorney, Agent, or Firm* — Leydig, Voit & Mayer, Ltd.

(57) ABSTRACT

A method of preparing a security laminate including the steps of: a) providing a polyethylene terephthalate substrate (1); b) stretching the polyethylene terephthalate substrate in either a longitudinal or a transversal direction; c) coating and drying a first coating composition (2) on the stretched polyethylene terephthalate substrate; d) stretching the coated polyethylene terephthalate substrate in the longitudinal or transversal direction not selected in step b) in order to obtain a coated biaxially stretched polyethylene terephthalate substrate having a layer of the first coating composition with a dry thickness between 50 nm and 400 nm; e) coating and drying a second coating composition (3) on top of the dry layer on the biaxially stretched substrate, wherein the first coating composition contains a copolymer selected from the group consisting of a hydroxyl—functional, partially-hydrolyzed vinyl chloride/vinyl acetate copolymer and a polyester-urethane copolymer; and wherein the second coating composition contains a hydroxyl—functional, partially-hydrolyzed vinyl chloride/vinyl acetate copolymer. Security laminates and security documents containing them are also disclosed.

30 Claims, 3 Drawing Sheets

(51) Int. Cl.
  B32B 37/14 (2006.01)
  B42D 25/00 (2014.01)
  B29C 55/14 (2006.01)
  B32B 37/24 (2006.01)
  B32B 38/00 (2006.01)
  B42D 25/47 (2014.01)

(52) U.S. Cl.
  CPC .......... *B29C 55/14* (2013.01); *B32B 2037/243* (2013.01); *B32B 2038/0028* (2013.01); *B32B 2255/10* (2013.01); *B32B 2255/26* (2013.01); *B32B 2309/02* (2013.01); *B32B 2309/105* (2013.01); *B32B 2367/00* (2013.01); *B32B 2425/00* (2013.01); *B42D 2033/30* (2013.01); *B42D 2033/46* (2013.01); *B42D 25/47* (2014.10)
  USPC .......................................... 235/488; 235/379

(56) References Cited

U.S. PATENT DOCUMENTS

| 7,648,074 | B2* | 1/2010 | Attenberger et al. .......... 235/491 |
| 8,333,870 | B2* | 12/2012 | Burchard et al. .............. 162/140 |
| 8,381,988 | B2* | 2/2013 | Lister et al. .................... 235/487 |
| 2007/0218223 | A1* | 9/2007 | Brennan et al. ............. 428/32.24 |
| 2008/0238086 | A1 | 10/2008 | Geuens et al. |

* cited by examiner

US 8,973,830 B2

PET-C BASED SECURITY LAMINATES AND DOCUMENTS

CROSS-REFERENCE TO RELATED APPLICATIONS

This patent application is a national phase application of PCT/EP2011/054677, filed Mar. 28, 2011, which claims the benefit of U.S. Provisional Patent Application No. 61/328,651, filed Apr. 28, 2010, and European Patent Application No. 10159283.0, filed Apr. 8, 2010, the disclosures of which are incorporated herein by reference.

TECHNICAL FIELD

This invention relates to security laminates containing a crystalline polyethylene terephthalate (PET-C) substrate and their incorporation into security documents.

BACKGROUND ART

Security cards are widely used for various applications such as identification purposes (ID cards) or financial transfers (credit cards). Such cards typically consist of a laminated structure consisting of various plastic lamellae and layers wherein one or more of them carry information, e.g. alphanumeric information, logos, a picture of the card holder, etc. A principal objective of security cards is that it cannot be easily modified or reproduced in such a way that the modification or reproduction is difficult to distinguish from the original.

Writable cards wherein the user can store digital information are also known, e.g. cards comprising a magnetic strip, optically recordable cards or cards comprising an electronic chip, sometimes called 'smart cards'.

In a number of application fields, the average daily usage of cards has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.—ready for immediate use.

In combination with higher stress levels seen by the card body, the issuers at the same time want to extent the validity periods of their cards, because of the high cost of the embedded electronics. Marketeers want to keep their cards looking shiny and brand-new in the hands of their customers. And smart issuers will demand from their suppliers to assume all costs related to premature return from the field.

The combination of these factors—higher card demand, more frequent usage, less careful storage, longer validity requirements and higher total costs, forces card makers and issuing bodies to look for higher performance materials for the card body.

PVC (polyvinylchloride) is the most widely used material for plastic cards, because of its ease of printing and laminating and its low cost. The biggest disadvantage is the low durability of the card body, resulting in an effective lifetime of only 1-3 years, much lower than the lifetime of the often expensive chips. Other materials like Teslin and ABS are only suitable for very low-end or single-use cards. PC (polycarbonate) can be used for longer-life and more secure ID cards, but has a high production cost and a low resistance to torsion, scratching and chemicals.

PET-G (polyethylene terephthalate glycolised) is a kind of amorphous polyester which has not been toughened like crystalline polyester but rather processed to become more compatible with standard PVC card manufacturing. Durability of PET-G cards is comparable to that of PVC cards.

PET-C (crystalline polyethylene terephthalate) is a material that is very durable and resistant to mechanical influences (flexion, torsion, scratches), chemical substances, moisture and temperature ranges. Untreated PET-C cannot be sealed or laminated to itself or to other materials, but require additional coatings or layers to accomplish this.

Lamination of PET-C films for preparing credit cards is known from U.S. Pat. No. 5,171,625 (ICI) which however discloses only an all polyester composite film structure for a credit card. An opaque, biaxially oriented polyester support core film and a clear, biaxially oriented polyester top film are heat sealed together by means of isophthalate-terephthalate copolyester based dye receptive or printable receiver film(s) which are sandwiched between the top surface of the core film and one surface of the top film. There is no disclosure of lamination to other type of materials such as PVC or PC. The co-extruded dye receptive or printable receiver films also have a large thickness of 0.5 μm up to 50 μm.

WO 2009/063058 (AGFA GEVAERT) discloses the lamination of a security laminate comprising a biaxially oriented polyester lamella and an adhesion system associated therewith on other type of materials such as PVC and PC. The adhesion system includes a layer system comprising a polyester, a polyester-urethane or a copolymer of a chlorinated ethylene, the layer system being contiguous with the polyester lamella during at least part of the biaxial orientation and having a thickness of at least 1.0 μm. In the examples, the layer system is mostly based on copolymers of chlorinated ethylene exhibiting improved peel strength with increasing thickness of the layer system. The best adhesion results are obtained for layer system thicknesses of 2.7 μm to 25.5 μm. Such a large thickness however reduces the production speed of security laminates and thus productivity. In addition, bank cards, credit cards, driving licenses and the like are required to have a format as specified by ISO 7813, i.e. having the dimensions 85.60 mm×53.98 mm and a thickness of 760 μm±80 μm. A large thickness of the adhesion system reduces the options for incorporating laminates and layers within the thickness of 760 μm of ISO 7813.

Since methods for falsification and counterfeiting of security documents continue to develop and improve, it remains a constant battle to protect security documents against falsification and counterfeiting. Therefore a need exists to provide simple and cost-effective methods for securing documents which also have a longer life time despite more frequent usage and less careful storage.

SUMMARY OF INVENTION

In order to overcome the problems described above, preferred embodiments of the present invention provide a method for preparing a security laminate as defined herein. It was surprisingly found that specific copolymers allowed thin security laminates which after lamination could not be delaminated from a security document even after a prolonged submersion in water.

Further advantages and embodiments of the present invention will become apparent from the following description.

DETAILED DESCRIPTION

Definitions

Figure 1:
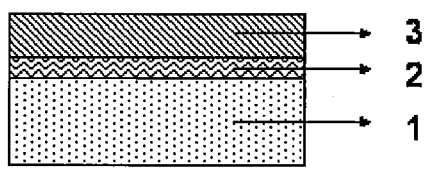
FIG. 1A shows a cross section of a security laminate having a biaxially stretched polyethylene terephthalate substrate 1 and a layer 2 of a first coating composition and a layer 3 of a second coating composition.
FIG. 1B shows the security laminate having layers 2 and 3 on both sides of the biaxially stretched polyethylene terephthalate substrate 1.
Figure 1:
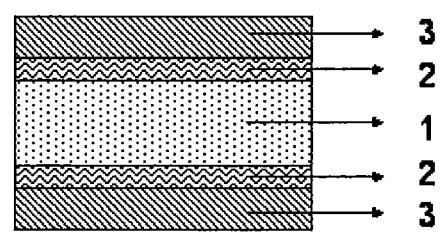

The definitions of security features correspond with the normal definition as adhered to in the "Glossary of Security Documents—Security features and other related technical terms" as published by the Consilium of the Council of the European Union on Aug. 31, 2009 (Version: v.09916.08.en) on its website: http://www.consilium.europa.eu/prado/EN/glossaryPopup.html.

The term "lamella", as used in disclosing the present invention, means a self-supporting polymeric sheet optionally provided with one or more layers.

The term "layer" is considered not to be self-supporting and requires a lamella as a support.

The term "security document system", as used in disclosing the present invention means one or more lamellae and/or layers.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) is used in the production of cards.

"PET-C" is an abbreviation for crystalline PET, i.e. a biaxially stretched polyethylene terephthalate. Such a polyethylene terephthalate support has excellent properties of dimensional stability.

Methods for Preparing Security Laminates

The method of preparing a security laminate according to the present invention includes the steps of:
a) providing a polyethylene terephthalate substrate;
b) stretching the polyethylene terephthalate substrate in either a longitudinal or a transversal direction;
c) coating and drying a first coating composition on the stretched polyethylene terephthalate substrate;
d) stretching the coated polyethylene terephthalate substrate in the longitudinal or transversal direction not selected in step b) in order to obtain a coated biaxially stretched polyethylene terephthalate substrate having a layer of the first coating composition with a dry thickness between 50 nm and 400 nm;
e) coating and drying a second coating composition on top of the dry layer on the biaxially stretched substrate, wherein the first coating composition contains a copolymer selected from the group consisting of a hydroxyl-functional, partially-hydrolyzed vinyl chloride/vinyl acetate copolymer and a polyester-urethane copolymer; and wherein the second coating composition contains a hydroxyl-functional, partially-hydrolyzed vinyl chloride/vinyl acetate copolymer.

In a preferred embodiment the polyethylene terephthalate substrate is stretched in step b) in a longitudinal direction and stretched in step d) in a transversal direction.

The first coating composition preferably contains a hydroxyl-functional, partially-hydrolyzed vinyl chloride/vinyl acetate copolymer. A suitable hydroxyl-functional, partially-hydrolyzed vinyl chloride/vinyl acetate copolymer is UCAR™ VAGD Solution vinyl resin from UNION CARBIDE. In a preferred embodiment, the hydroxyl-functional, partially-hydrolyzed vinyl chloride/vinyl acetate copolymer has a composition substantially made from vinylchloride and containing at least 5 wt % of partially hydrolyzed vinyl acetate. The hydroxyl-functional, partially-hydrolyzed vinyl chloride/vinyl acetate copolymer is made using preferably at least 70 wt % of vinylchloride and more preferably at least 85 wt % of vinylchloride. The vinyl acetate in the hydroxyl-functional, partially-hydrolyzed vinyl chloride/vinyl acetate copolymer is hydrolyzed preferably for at least 3 wt % and more preferably for at least 5 wt % with all wt % base on the total weight of the copolymer.

The first coating composition preferably contains a polyester urethane, which allows coating using an aqueous coating composition, which is ecologically more advantageous than a coating composition made from an organic solvent, such as MEK. A preferred polyester urethane is made using isoforondiisocyanate, hexanediol and adipinic acid. A suitable example is Bayhydrol™ UH2558 available from BAYER. The polyester utrethane preferably has a glass transition temperature of less than 60°, with a glass transition temperature of less than 40° C. being preferred and a glass transition temperature of less than 20° C. being particularly preferred.

The dry thickness of the layer of the first coating composition should have a thickness between 50 nm and 400 nm, preferably a thickness between 100 nm and 25 nm, and most preferably about 200 nm. With a thickness of less than 50 nm the security laminate has insufficient adhesion and delamination between the biaxially stretched polyethylene terephthalate substrate and the layer of the first coating composition can be observed. A thickness of less than 400 nm not only allows a high production speed and productivity, but also increases the options for incorporating different lamellae and layers while staying within the thickness restrictions of ISO 7813. In addition, to have maximum options available for incorporating different lamellae and layers while staying within the thickness restrictions of ISO 7813, the thickness of the dry layer of the second coating composition is preferably between 1 μm and 5 μm, more preferably between 2 μm and 4 μm, and most preferably about 3 μm.

In a preferred embodiment, the coated biaxially stretched polyethylene terephthalate substrate of step d) has a thickness of no more than 100 μm, preferably of less than 90 μm, most preferably of less then 70 μm.

The first and/or second coating compositions can be coated using any conventional coating technique, such as dip coating, knife coating, extrusion coating, spin coating, slide hopper coating and curtain coating.

The first and/or second coating compositions can also be coated using a spraying device or a jetting device, such as an inkjet print head. Using an inkjet print head allows the compositions to be coated according to a pattern or an image.

The second coating composition can also be coated using a screen printing device.

Figure 5:
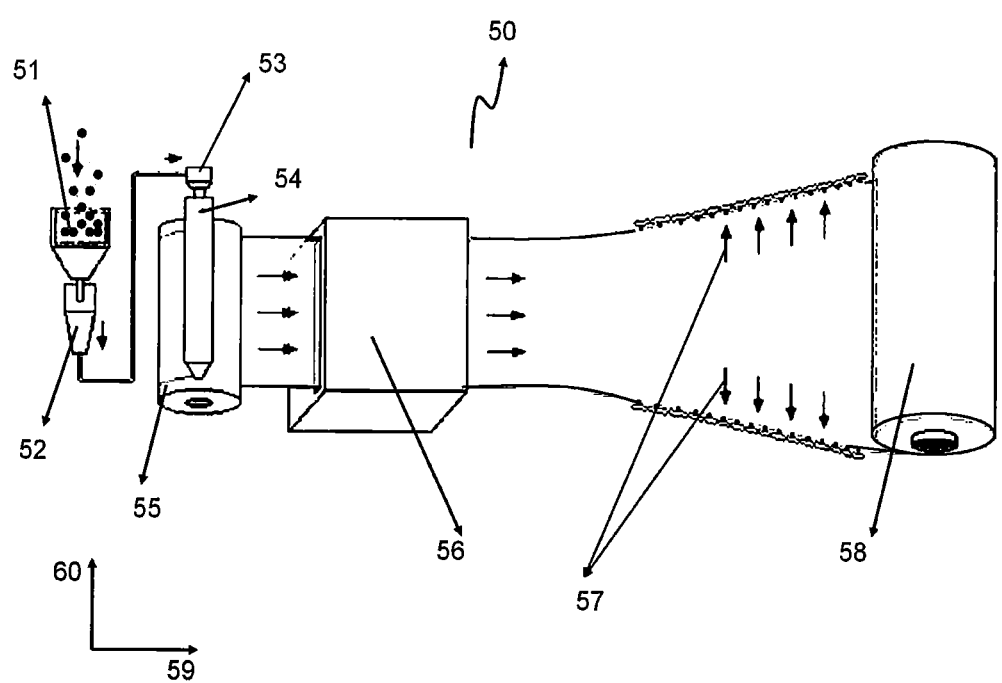
FIG. 5 shows a process 50 for manufacturing a polyethylene terephthalate substrate which is then biaxially stretched, i.e. first in a longitudinal direction 59 and then in a transversal direction 60.

The manufacturing of polyester supports is well-known in the art of preparing suitable supports for silver halide photographic films. For example, GB 811066 (ICI) teaches a process to produce biaxially oriented films of polyethylene terephthalate. A schematic representation is also given in FIG. 5, which shows the manufacturing of a polyethylene terephthalate substrate followed by the biaxial stretching thereof. PET chips are received by a chip bunker 51 and then provided in molten form by extruder 52 over a filter 53 to a die 54 which coats the filtered molten PET onto a casting drum 55 where it solidifies to a polyethylene terephthalate substrate. The polyethylene terephthalate substrate is first stretched 56 according to a longitudinal axis 59 and thereafter stretched 57 according to a transversal axis 60, before being rolled up by the roll wind up 58. In the method of preparing a security laminate according to the present invention, in between the longitudinal stretching 56 and the transversal stretching 57 the first coating composition is coated (not shown in FIG. 5) onto the longitudinally stretched polyethylene terephthalate substrate.

The polyethylene terephthalate substrate is preferably biaxially stretched with a stretching factor of at least 2.0, more preferably at least 3.0 and most preferably a stretching factor of about 3.5. The temperature used during stretching is preferably about 160° C.

Figure 3:
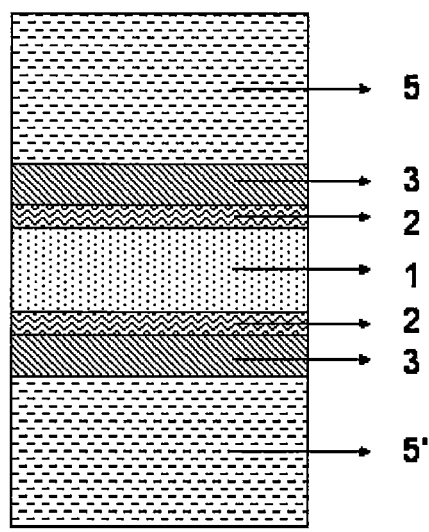
FIG. 3 shows a cross section of a security document or a security document precursor using the security laminate of FIG. 1B as a support for two security document systems 5 and 5' consisting of one or more lamellae and/or layers, e.g. a laser engraveable PVC or PC lamella.
Figure 4:
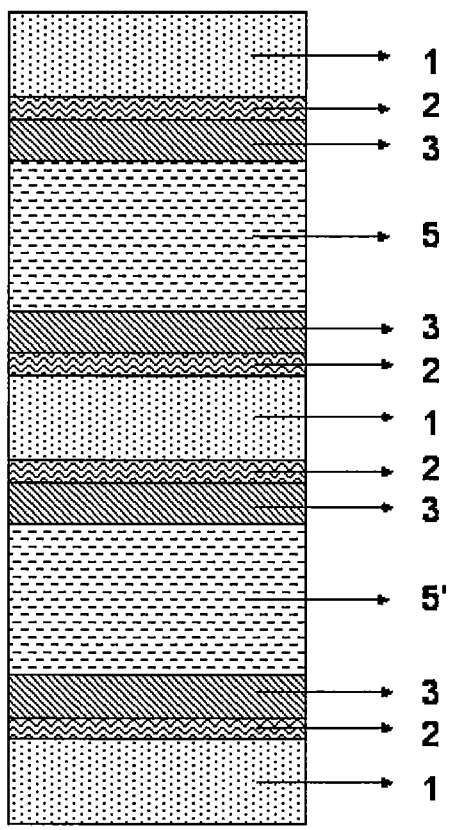
FIG. 4 shows a cross section of a security document wherein the security document precursor of FIG. 3 has been laminated on both sides with a security laminate according to FIG. 1A.

In a preferred embodiment, the polyethylene terephthalate of the security laminates according to FIG. 1A are transparent, allowing e.g. information of the security document (precursor) according to FIG. 1B or FIG. 4 to be visible by the naked eye. Alternatively the polyethylene terephthalate may be opaque, which is especially useful in security laminates according to FIG. 1B as used in security document (precursors) according to FIG. 3 and FIG. 4, for example to enhance the readability of information contained in the security document systems 5 and/or 5'.

Methods to obtain opaque polyethylene terephthalate substrates and biaxially oriented films thereof of have been disclosed in, e.g. US 2008238086 (AGFA)).

Security Laminates

The security laminate according to the present invention is obtained by the method as described above.

The security laminate can be foreseen on one side (see FIG. 1A) or on both sides (see FIG. 1B) of the biaxially stretched polyethylene terephthalate substrate 2 with a layer 1 of a first coating composition and thereon a layer 2 of a second coating composition. In the case of the double side coated security laminate of FIG. 1B the composition and/or thickness of the layers of the first and/or the second coating compositions do not have to be identical. However, in a preferred embodiment the layers of first coating compositions and/or the layers of the second coating compositions have the same composition.

In a preferred embodiment, the security laminate has preferably a thickness of no more than about than 110 µm, preferably a thickness between 12 µm and about 95 µm and most preferably a thickness between 30 µm and 70 µm.

The biaxially stretched polyethylene terephthalate substrate should be sufficiently thick to be self-supporting, but thin enough to be flexed, folded or creased without cracking. Preferably, the biaxially stretched polyethylene terephthalate substrate has a thickness of between about 7 µm and about 100 µm, more preferably between about 10 µm and about 90 µm, most preferably between about 25 µm and about 80 µm.

Security Document and Precursors

A security document precursor may become a security document on lamination of the security laminate. However, a security document precursor only becomes a security document when the final security features, images and information are added to the security document precursor, and the document can be handed over to the end-user. If e.g. an additional layer containing a hologram must still be added on the backside of the document having the security laminate on the front side, then the document is considered a security document precursor. In the text below we will refer to a security document, but it includes and addresses also a security document precursor if the above conditions are fulfilled. A document having neither an image on the front side nor the backside cannot be considered a security document. A security document precursor may itself be composed of one or more security document precursors.

The security laminates according to the present invention can be advantageously used to produce security documents which are better protected against falsification because the security laminates cannot be delaminated without tearing the security document apart and/or which are produced in cost-effective way to exhibit a longer life time despite more frequent usage and less careful storage of the security document.

In one embodiment, the security laminate according to FIG. 1A is laminated with the layer 3 of the second coating composition onto one side (see FIG. 2A) or onto both sides (see FIG. 2B) of a security document core 4. The security laminates in FIG. 2B may have the same composition or thickness for the layer 2 of the first coating composition and/or the layer 3 of the second coating composition. Preferably, the security laminates used in FIG. 2B are identical since this reduces the stock of precursors for a security document integrator.

Figure 2:
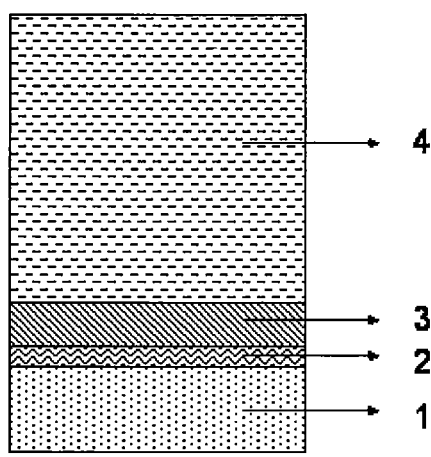
FIG. 2A shows a cross section of a security document with a security document core 4 and the security laminate of FIG. 1A laminated against one side of the security document core 4.
FIG. 2B shows a cross section of a security document with a security document core 4 having the security laminate of FIG. 1A laminated against both sides of the security document core 4.
Figure 2:
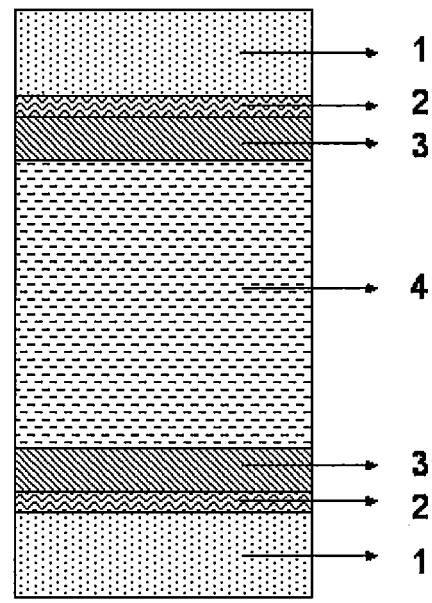

In a preferred embodiment of the security document as shown in FIG. 2A and FIG. 2B, at least one of the outermost surfaces of the security document is polyethylene terephthalate. Alternatively, one of the security laminates may be of a different composition or thickness than the security laminate according to the present invention. For example a laminate may be used having a laser engraveable surface, e.g. PC.

In a more preferred, the security laminates on both outermost surfaces of the security document are polyethylene terephthalate, as shown in FIG. 2B, which gives the security document optimal protection against wear and tear; and chemical agents. Such chemical agents may be part of an attempt to falsify the security document.

In the above security documents, the security document core 4 is preferably at least partially made of a lamella selected from the group consisting of an amorphous polyester lamella, a crystalline polyester lamella, a polycarbonate lamella, a polyolefin lamella and a polyvinyl chloride lamella.

The security document core 4 may be provided, e.g. by thermal dye transfer or inkjet printing, with images or text. Optionally, non-varying information, such as lines, line segments, dots, letters, characters, logos, guilloches, etc., can be printed on the security document core, for example, by flexo or offset printing before attaching the security document core to the security laminate.

In one embodiment of the security document, the security document core contains the security laminate as described above. An example of such a security document construction is shown by FIG. 3, wherein the security laminate of FIG. 1B is used to provide layers of the first and second coating compositions on both sides of the biaxially stretched polyethylene terephthalate substrate for good adhesion of two security document systems 5 and 5' consisting of one or more lamellae and/or layers, e.g. a laser engraveable PVC or PC lamella.

FIG. 4 shows a cross section of a security document wherein the security document precursor of FIG. 3 has been laminated on both sides with a security laminate according to FIG. 1A in order to further enhance the problems for falsification and/or to enhance the life time despite more frequent usage and less careful storage of the security document.

The security document according to the present invention is preferably an identity document selected from the group consisting of an identity card, a security card, a driver's licence card, a social security card, a membership card, a time registration card, a bank card, a pay card and a credit card. In a preferred embodiment, the security document according to the present invention is a personal identity document.

The security document may also be a "smart card", meaning an identification card incorporating an integrated circuit as a so-called electronic chip. In a preferred embodiment the security document is a so-called radio frequency identification card or RFID-card. An RFID-card includes a chip and an antenna, such a chip is usually a contactless chip.

If the security document contains a contact chip, then preferably part of an outermost polyethylene terephthalate surface is interrupted to allow electrical contact with the chip.

Lamellae, Layers and Security Document Systems

Any lamella, layer or security document system suitable for security documents may be used. They include plain polymeric films of e.g. PVC, PC, PET-G, ABS, Teslin, and the like, for example, to provide the security document with a lamella of sufficient thickness to include a memory chip.

Lamella, layers or security document systems include those having a specific purpose, for example:
- Addition of information and images (e.g. inkjet receiving layers, laser markable layers or lamellae, diffusion transfer layers . . . )
- Addition of security features (lamella, layers or security document systems containing coloured fibres, fluorescent fibres and planchettes, fluorescent pigments, OVD and DOVID, metallic pigments, magnetic material, phosphorescent pigments and dyes, . . . )
- Addition of functional features (lamella, layers or security document systems for providing adhesive properties, antistatic properties . . . )

Security Features

To prevent forgeries of identification documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

The security document according to the present invention may contain any suitable security features known in the art, such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™), overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

A combination of the security document according to the present invention with one of the above security features increases the difficulty for falsifying the document.

Other Ingredients

The first and/or second coating composition used in the method for preparing a security laminate according to the present invention may include other ingredients as long as it does not deteriorate the adhesion strength of the layers of the first and/or second coating composition towards other lamellae or PETC in such a manner that easy delamination can be accomplished.

Such ingredients include, for example, surfactants to enhance the quality of the coating of the first and second coating composition, or colorants to provide an aesthetical or functional purpose such as securing the document or providing the document with information of the card holder. The surfactant is preferably an anionic or non-ionic surfactant.

The first and/or second coating composition may also contain colloidal particles preferably being inorganic colloidal particles and particularly preferably being colloidal silica particles. Suitable organic particles include crosslinked polystyrene particles.

In a preferred embodiment, the first and/or second coating composition used in the method for preparing a security laminate according to the present invention includes one or more UV blocking agents. Suitable UV blocking agents include hindered amine light stabilizers and benzotriazole derivatives such as 2-(3'-tert-butyl-5'-(2-octyloxycarbonylethyl)-2'-hydroxyphenyl)-5-chlorobenzotriazole, 2-(2-hydroxy-3-tert-butyl-5-methylphenyl)-5-chloro-2H-benzotriazole, 2-(2-hydroxy-3,5-di-α-cumylphenyl)-2H-benzotriazole, 2-(2-Hydroxy-3,5-di-tert-butylphenyl)-5-chlorobenzotriazole and 2,2'-methylenebis[4-(1,1,3,3-tetramethylbutyl)-6-benzotriazol-2-ylphenol]. Commercial examples include Tinuvin™ 109, Tinuvin™ 213, Tinuvin™ 234, Tinuvin™ 326, Tinuvin™ 327 and Tinuvin™ 360 available from CIBA. The UV blocking agent provides an additional protection, e.g. preventing the fading of dye images on the security document core.

Other ingredients include thickeners, antistatic agents, biocides, light stabilizers and the like.

INDUSTRIAL APPLICATION

The security laminates according to the present invention can be used in identity documents such as driver's licenses, ID-cards and passports, and on other important documents such as certificates of title. Security laminates are also useful as tamper proof seals on medications, video cassettes, and compact discs.

EXAMPLES

Materials

All materials used in the following examples were readily available from standard sources such as ALDRICH CHEMICAL Co. (Belgium) and ACROS (Belgium) unless otherwise specified. The water used was deionized water.

MEK is an abbreviation used for methylethylketon.

UCAR™ VAGD Solution vinyl resin is a hydroxyl-functional, partially-hydrolyzed vinyl chloride/vinyl acetate resin from UNION CARBIDE. The copolymer has a composition of 90/4/6 wt % for vinylchloride/vinyl acetate/vinylalcohol.

CCE is DIOFAN™ A658, a polyvinylidenechloride-methacrylate-itaconic acid copolymer from SOLVAY.

CCE-02 is a 30% by weight aqueous dispersion of CCE.

KIESELSOL™ 100F is a 36% aqueous dispersion of colloidal silica available from BAYER.

MERSOLAT™ H is 76% aqueous paste of a sodium pentadecyl-sulfonate from BAYER.

MERSOL is a 3.7 wt % solution of MERSOLAT™ H in water.

Resorcine is resorcinol available from SUMITUMO CHEMICAL EUROPE. Bayhydrol™ UH2558 is cosolvent free aliphatic anionic polyurethane dispersion (containing ca 37.2% solid) based on a polyester urethane of isoforondiisocyanate, hexanediol and adipinic acid from BAYER. Paresin is a dimethyltrimethylolmelamine formaldehyde resin available under the trade name PAREZ™ RESIN 613 from American Cyanamid Company.

DR274 is a 10% aqueous solution of copolymer of 60% poly(methylsilylsesquixane)silylepoxy 60/40 available as SR342 (previously TOSPEARL™ 120) from GENERAL ELECTRIC, but manufactured by TOSHIBA. The average particle size is 2 μm SR344 is poly(methylsilylsesquixane) silylepoxy 60/40 available as SR344 (previously TOSPEARL™ 145) from GENERAL ELECTRIC, but manufactured by TOSHIBA. The average particle size is 4.5 μm.

DR270 is an aqueous solution containing 2.5 wt % of DOWFAX™ 2A1 and 2.5 wt % of Surfynol™ 420.

DOWFAX™ 2A1 is a surfactant (CASRN 12626-49-2) from DOW CHEMICAL.

Surfynol™ 420 is a 2,4,7,9-Tetramethyl-5-decyne-4,7-diol-bispolyoxyethylene ether surfactant from AIR PRODUCTS & CHEMICALS.

Measurement Methods

1. Peel Strength

The delamination resistance of the laminates were evaluated using the test method for dry and wet peel strength described in ISO/IEC 7810:1995 with an Instron and corner impact. The wet peel strength was performed after 24 hours of submersion in water.

The evaluation score used in the examples is given by Table 1.

TABLE 1

| Evaluation score | Evaluation |
|---|---|
| OK | No delamination possible, immediate tearing of one of the lamellae. The peelstrength is higher than 8 N/cm. |
| Not OK | Delamination possible with a peel strength of less than 8 N/cm. |

Preparation of Coating Compositions

The coating composition COAT-1 was prepared by mixing the components according to Table 2 using a dissolver.

TABLE 2

| Component | wt % |
|---|---|
| MEK | 87.40 |
| SR344 | 0.06 |
| UCAR ™ VAGD Solution vinyl resin | 12.54 |

The coating composition COAT-2 was prepared by mixing the components according to Table 3 using a dissolver.

TABLE 3

| Component | wt % |
|---|---|
| Water | 77.87 |
| Resorcine | 0.99 |
| Bayhydrol ™ UH2558 | 18.55 |
| Paresin | 0.57 |
| DR274 | 0.68 |
| DR270 | 1.34 |

The coating composition COAT-3 was prepared by mixing the components according to Table 4 using a dissolver.

TABLE 4

| Component | wt % |
|---|---|
| water | 87.32 |
| CCE-02 | 7.10 |
| KIESELSOL ™ 100F | 5.54 |
| MERSOL | 0.04 |

Preparation of Security Laminates

The comparative security laminates COMP-SL1 to COMP-SL9 and the inventive security laminates INV-SL1 and INV-SL2 were prepared as described by Table 5.

The manner of preparation is now exemplified for the inventive security laminate INV-SL2. After stretching a 1,100 μm thick polyethylene terephthalate substrate longitudinally, a first coating composition COAT-2 was coated onto the longitudinally stretched PET and dried. The coated longitudinally stretched PET was then transversally stretched to produce a 63 μm thick coated biaxially stretched polyethylene terephthalate substrate having a layer of the first coating composition with a dry thickness DT of 219 nm. A second coating composition COAT-1 was coated and dried on top of the dry layer of the first coating composition COAT-2 on the biaxially stretched substrate. The dry thickness DT of the second layer was 3.0 μm.

The comparative security laminates COMP-SL3 to COMP-SL6 and the inventive security laminate INV-SL1 were prepared in exactly the same manner except that the coating compositions and the dry thicknesses of the layers thereof were used as shown in Table 5.

The comparative security laminates COMP-SL1 and COMP-SL2 only differ from the inventive security laminates INV-SL1 respectively INV-SL2, by the fact that the first coating composition was applied after the transversal stretching instead of the longitudinal stretching.

The comparative security laminates COMP-SL7 to COMP-SL9 only differ from the comparative security laminate COMP-SL6 by the fact that, after transversal stretching but before the coating of the second coating composition COAT-1, an extra layer of the coating composition COAT-3 was coated and dried in order to have a dry thickness DT as shown in Table 5, and followed by an additional heat treatment of 10 minutes at 80° C.

TABLE 5

| Security Laminate | Layer of First coating composition | | | Extra layer | | Layer of Second coating composition | |
|---|---|---|---|---|---|---|---|
| | composition | stretched | DT | composition | DT | composition | DT |
| COMP-SL1 | COAT-1 | No | 200 nm | No | — | COAT-1 | 3.0 μm |
| COMP-SL2 | COAT-2 | No | 219 nm | No | — | COAT-1 | 3.0 μm |
| COMP-SL3 | COAT-3 | Yes | 190 nm | No | — | COAT-1 | 5.2 μm |
| COMP-SL4 | COAT-3 | Yes | 270 nm | No | — | COAT-1 | 5.2 μm |
| COMP-SL5 | COAT-3 | Yes | 530 nm | No | — | COAT-1 | 5.2 μm |
| COMP-SL6 | COAT-3 | Yes | 190 nm | No | — | COAT-1 | 5.2 μm |
| COMP-SL7 | COAT-3 | Yes | 190 nm | COAT-3 | 3.8 μm | COAT-1 | 5.2 μm |
| COMP-SL8 | COAT-3 | Yes | 190 nm | COAT-3 | 7.4 μm | COAT-1 | 5.2 μm |
| COMP-SL9 | COAT-3 | Yes | 190 nm | COAT-3 | 18.3 μm | COAT-1 | 5.2 μm |
| INV-SL1 | COAT-1 | Yes | 200 nm | No | — | COAT-1 | 3.0 μm |
| INV-SL2 | COAT-2 | Yes | 219 nm | No | — | COAT-1 | 3.0 μm |

The comparative security laminates COMP-SL3 to COMP-SL9 correspond, as shown by Table 6, to examples given in WO 2009/063058 (AGFA GEVAERT) which are laminated against PVC.

TABLE 6

| Security laminate | Example in WO2009/063058 |
|---|---|
| COMP-SL3 | PET/B1/SA1/PVC |
| COMP-SL4 | PET/B2/SA1/PVC |
| COMP-SL5 | PET/B3/SA1/PVC |
| COMP-SL6 | PET/B6/SA1/PVC |
| COMP-SL7 | PET/B6/K2/SA1/PVC |
| COMP-SL8 | PET/B6/K3/SA1/PVC |
| COMP-SL9 | PET/B6/K4/SA1/PVC |

Evaluation of Security Laminates

The comparative security laminates COMP-SL1 to COMP-SL9 and the inventive security laminates INV-SL1 and INV-SL2 were used to prepare comparative samples COMP-SD1 to COMP-SD9 and inventive samples in accordance with FIG. 2B having a security document core of PVC or PETG.

All samples were prepared in the same manner by laminating the security laminates at a lamination temperature of 160° C. onto both sides of the 500 μm opaque security document core according to Table 7 using an Oasys OLA6/7 plate laminator with the settings: LPT=160° C., LP=40, Hold=150 sec, HPT=130° C., HP=40 and ECT=50° C.

TABLE 7

| Sample | Security Document Core | Security laminate |
|---|---|---|
| COMP-SD1 | PETG | COMP-SL1 |
| COMP-SD2 | PVC | COMP-SL2 |
| COMP-SD3 | PVC | COMP-SL3 |
| COMP-SD4 | PVC | COMP-SL4 |
| COMP-SD5 | PVC | COMP-SL5 |
| COMP-SD6 | PVC | COMP-SL6 |
| COMP-SD7 | PVC | COMP-SL7 |
| COMP-SD8 | PVC | COMP-SL8 |
| COMP-SD9 | PVC | COMP-SL9 |
| INV-SD1 | PETG | INV-SL1 |
| INV-SD2 | PVC | INV-SL1 |
| INV-SD3 | PETG | INV-SL2 |
| INV-SD4 | PVC | INV-SL2 |

The samples were tested for dry and wet peel strength. The results are given in Table 8.

TABLE 8

| Sample | Peel strength | | Productivity | Thickness security laminates |
|---|---|---|---|---|
| | Dry | Wet | | |
| COMP-SD1 | Not OK (0.3 N/cm) | Not OK | OK | 66.0 μm |
| COMP-SD2 | Not OK (0.5 N/cm) | Not OK | OK | 66.2 μm |
| COMP-SD3 | Not OK (4.6 N/cm) | Not OK | OK | 68.4 μm |
| COMP-SD4 | Not OK | Not OK | OK | 68.5 μm |
| COMP-SD5 | Not OK | Not OK | OK | 68.7 μm |
| COMP-SD6 | Not OK (3.3 N/cm) | Not OK | OK | 68.4 μm |
| COMP-SD7 | OK | OK | Not OK | 72.2 μm |
| COMP-SD8 | OK | OK | Not OK | 86.7 μm |
| COMP-SD9 | OK | OK | Not OK | 75.8 μm |
| INV-SD1 | OK | OK | OK | 66.0 μm |
| INV-SD2 | OK | OK | OK | 66.0 μm |
| INV-SD3 | OK | OK | OK | 66.2 μm |
| INV-SD4 | OK | OK | OK | 66.2 μm |

From Table 8, it should be clear that only the samples INV-SD1 to INV-SD4 employing security laminates based on a hydroxyl-functional, partially-hydrolyzed vinyl chloride/vinyl acetate copolymer and a polyester-urethane copolymer are capable of delivering thin security laminates exhibiting high peel strength.

The comparative samples COMP-SD3 to COMP-SD6 using thin security laminates prepared based on a polyvinylidenechloride copolymer are incapable of providing good peel strength. By applying an extra layer of the polyvinylidenechloride copolymer to the comparative security laminate COMP-SL-6, as shown for security laminates COMP-SL7 to COMP-SL9, thicker security laminates were obtained exhibiting good peel strength. However, these security laminates COMP-SL7 to COMP-SL9 cannot be manufactured in economically viable way because of the required extra heat treatment of 10 minutes at 80° C. The larger thickness of the security laminates COMP-SL7 to COMP-SL9 also reduces the available thickness to incorporate additional layers or lamellae in or on the security document core.

The invention claimed is:
1. A method of preparing a security laminate including the steps of:
   a) providing a polyethylene terephthalate substrate;
   b) stretching the polyethylene terephthalate substrate in either a longitudinal or a transversal direction;
   c) coating and drying a first coating composition on the stretched polyethylene terephthalate substrate;

d) stretching the coated polyethylene terephthalate substrate in the longitudinal or transversal direction not selected in step b) in order to obtain a coated biaxially stretched polyethylene terephthalate substrate having a layer of the first coating composition with a dry thickness between 50 nm and 400 nm; and e) coating and drying a second coating composition on top of the dry layer on the biaxially stretched substrate;

wherein the first coating composition contains a copolymer selected from the group consisting of a hydroxyl-functional, partially-hydrolyzed vinyl chloride vinyl acetate copolymer and a polyester-urethane copolymer; and wherein the second coating composition contains a hydroxyl-functional, partially-hydrolyzed vinyl chloride vinyl acetate copolymer.

2. The method according to claim 1, wherein the thickness of the dry layer of the second coating composition is between 1.0 μm and 5.0 μm.

3. The method according to claim 1, wherein the thickness of the coated biaxially stretched polyethylene terephthalate substrate of step d) has a thickness of less than 80 μm.

4. The method according to claim 2, wherein the thickness of the coated biaxially stretched polyethylene terephthalate substrate of step d) has a thickness of less than 80 μm.

5. A security laminate obtained by the method as defined in claim 1.

6. A security laminate obtained by the method as defined in claim 2.

7. A security laminate obtained by the method as defined in claim 3.

8. A security laminate obtained by the method as defined in claim 4.

9. A security document containing the security laminate as defined in claim 5.

10. A security document containing the security laminate as defined in claim 8.

11. The security document according to claim 9 containing the security laminate on one or both sides of a security document core.

12. The security document according to claim 11, wherein at least one of the outermost surfaces of the security document is polyethylene terephthalate.

13. The security document according to claim 11, wherein both outermost surfaces of the security document are polyethylene terephthalate.

14. The security document according to claim 9, wherein the security document core is at least partially made of a lamella selected from the group consisting of an amorphous polyester lamella, a crystalline polyester lamella, a polycarbonate lamella, a polyolefin lamella and a polyvinyl chloride lamella.

15. The security document according to claim 9, wherein the security document contains a security document core containing said security laminate.

16. The security document according to claim 9, wherein the security laminate in the security document core includes layers of the first and second coating compositions on both sides of the biaxially stretched polyethylene terephthalate substrate.

17. The security document according to claim 9, wherein the security document is an identity document.

18. The security document according to claim 12, wherein the security document includes a chip and optionally an antenna.

19. The security document according to claim 18, wherein the chip is a contactless chip.

20. The security document according to claim 18, wherein the chip is a contact chip wherein part of an outermost polyethylene terephthalate surface is interrupted to allow electrical contact with the chip.

21. The security document according to claim 10 containing the security laminate on one or both sides of a security document core.

22. The security document according to claim 21, wherein at least one of the outermost surfaces of the security document is polyethylene terephthalate.

23. The security document according to claim 21, wherein both outermost surfaces of the security document are polyethylene terephthalate.

24. The security document according to claim 10, wherein the security document core is at least partially made of a lamella selected from the group consisting of an amorphous polyester lamella, a crystalline polyester lamella, a polycarbonate lamella, a polyolefin lamella and a polyvinyl chloride lamella.

25. The security document according to claim 10, wherein the security document contains a security document core containing said security laminate.

26. The security document according to claim 10, wherein the security laminate in the security document core includes layers of the first and second coating compositions on both sides of the biaxially stretched polyethylene terephthalate substrate.

27. The security document according to claim 10, wherein the security document is an identity document.

28. The security document according to claim 22, wherein the security document includes a chip and optionally an antenna.

29. The security document according to claim 28, wherein the chip is a contactless chip.

30. The security document according to claim 28, wherein the chip is a contact chip wherein part of an outermost polyethylene terephthalate surface is interrupted to allow electrical contact with the chip.

\* \* \* \* \*